July 2, 1940.　　　　W. F. BOLDT　　　　2,206,657

ADJUSTABLE MOUNTING FOR BRAKE SHOES

Filed April 22, 1939

INVENTOR
WERNER F. BOLDT

BY

*E. E. Huffman*

ATTORNEY

Patented July 2, 1940

2,206,657

UNITED STATES PATENT OFFICE 2,206,657

ADJUSTABLE MOUNTING FOR BRAKE SHOES

Werner F. Boldt, Clayton, Mo., assignor to Wagner Electric Corporation, St. Louis, Mo., a corporation of Delaware Application April 22, 1939, Serial No. 269,521

5 Claims. (Cl. 188—79.5)

My invention relates to brakes and more particularly to the adjustable mounting of the brake shoe or shoes thereof.

One of the objects of my invention is to provide an improved adjustable eccentric anchor pin mounting for a brake shoe which is efficient in operation, simple in construction, and which can be manufactured at a reduced cost.

Another object of my invention is to construct an adjustable eccentric anchor pin for a brake shoe which can be so associated with an adjacent and like anchor pin for another brake shoe that both anchor pins can cooperate with each other to take the braking torque and yet permit each anchor pin to be independently adjusted.

Figure 1:
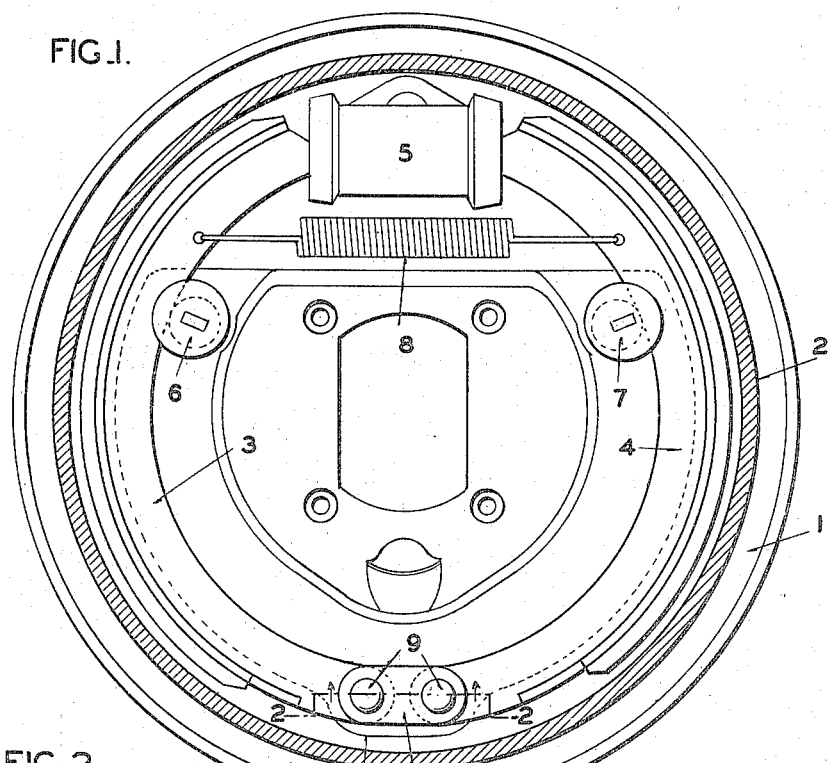
Figure 2:
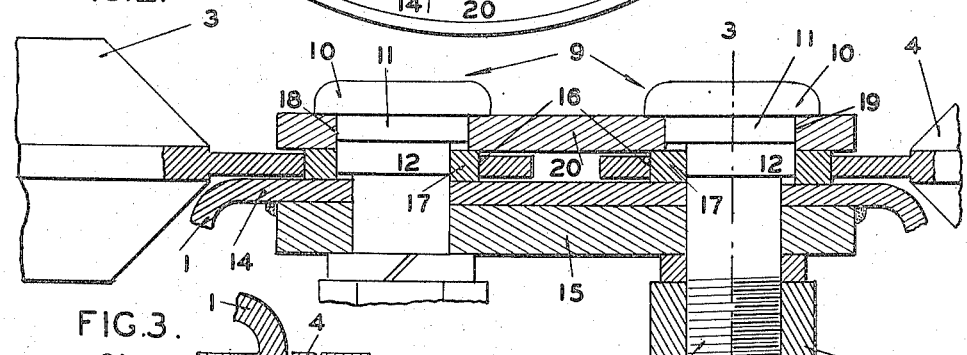
Figure 3:
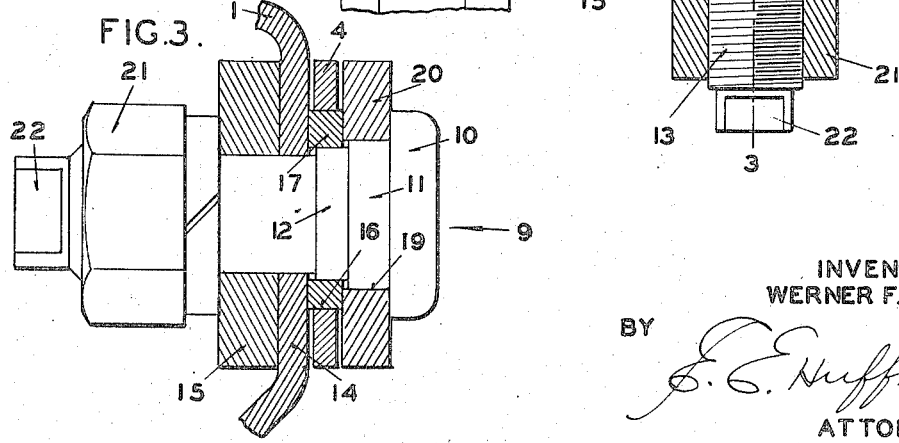

Other objects of my invention will become apparent from the following description taken in connection with the accompanying drawing in which Figure 1 is a view of a brake embodying my invention; Figure 2 is a cross-sectional view taken on the line 2—2 of Figure 1 and showing details of my improved mounting; and Figure 3 is another cross-sectional view taken on the line 3—3 of Figure 2.

Referring to the drawing in detail, Figure 1 discloses a well-known brake assembly comprising a backing plate 1 adapted to be secured to some fixed part of the vehicle and to close the open side of a drum 2 secured to the wheel of the vehicle. Within the drum are pivoted brake shoes 3 and 4 which are actuated by a fluid motor 5 and normally held disengaged from the drum and against the stops 6 and 7 by means of a spring 8. The heel or pivoted ends of the shoes are each adjustably mounted on the backing plate by means of my improved anchor pin construction shown in detail in Figures 2 and 3.

The anchor pins 9 for each brake shoe are of identical construction and each comprises a flanged end 10, a cylindrical concentric portion 11 adjacent the head, a cylindrical eccentric portion 12 adjacent the concentric portion, and a threaded portion 13 on the body which is of less diameter than the concentric portion 11. The pins are carried by a pressed out portion 14 of the backing plate 1, and this portion of the backing plate is reenforced by a plate 15 welded to the backing plate. The webs of the shoe ends are provided with bearing openings 16 and cooperating with each opening is a bearing collar 17 having concentric internal and external cylindrical surfaces. The internal diameter of the collar is such as to fit on the eccentric portion 12 of the anchor pin and the axial thickness of the bearing collar is slightly greater than the thickness of the web of the shoe (shown exaggerated). The concentric portions 11 of the anchor pins cooperate with spaced openings 18 and 19 of a connecting plate 20 which is of slightly greater thickness than the axial length of the concentric portion. The threaded portion of the anchor pins have cooperating therewith nuts 21 for clamping the collars to the backing plate and maintaining the pins in any adjusted position. Flats 22 on the end of the pin provide a tool engaging surface for rotating the pins.

Because the thickness of plate 20 is greater than the axial length of the concentric portion 11, the head 10 of the pin will cause collar 17 to be clamped between plate 20 and the backing plate when the nut 21 is tightened. The clamping of the collar will not interfere with the free pivoting of the shoes upon the collar since the collar is of greater axial thickness than the thickness of the shoe web. The construction of the anchor pins and their relation to plate 20 results in the force being taken by one anchor pin to be partially transferred to the other anchor pin through the plate. Since the connecting plate cooperates with the concentric portions of each anchor pin, there will be no binding of the anchor pin which will prevent each anchor pin from being freely adjusted independently of the other. The adjustment of each anchor pin is made by simply unscrewing the nut 21 and turning the pin by means of flats 22 to any desired position. When the pin is turned, the concentric portion 12 will shift collar 17 and the end of the shoe toward or away from the drum depending upon the direction of rotation of the pin. By having concentric internal and external surfaces on the bearing collars, these collars may be easily made from screw machine stock, thereby cheapening the cost of manufacture. The only eccentric surface which is necessary to make is on the pin and this can easily be formed on the pin when it is made by the cheaper upset process requiring no machining.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In braking mechanism, a support, a brake shoe having an opening, a rotatable anchor pin carried by the support and provided with an eccentric cylindrical portion, a bearing collar having inner and outer concentric surfaces and associated with the opening in the shoe, said bearing collar being rotatably mounted on the eccentric portion of the pin, and means including said pin for clamping the collar to the support to maintain it and the pin in a selected position.

2. In braking mechanism, a support, a brake shoe provided with a web having an opening, a rotatable anchor pin carried by the support and provided with an eccentric cylindrical portion, a bearing collar having inner and outer concentric surfaces and associated with the opening in the shoe, said bearing collar having an axial thickness greater than the thickness of the shoe web and being rotatably mounted on the eccentric portion of the pin, means carried by said pin for engaging the collar and for retaining said shoe in position on the collar, and means including said pin for clamping the collar between said last named means and the support and for maintaining the pin in a selected position.

3. In braking mechanism, a support, a brake shoe provided with a web having an opening, a rotatable anchor pin carried by the support and provided with a flanged end, a concentric cylindrical portion adjacent thereto, an eccentric cylindrical portion adjacent the concentric portion and a threaded portion, a bearing collar having inner and outer concentric surfaces and associated with the opening in the shoe, said bearing collar having an axial thickness greater than the thickness of the shoe web and being rotatably mounted on the eccentric portion of the pin, a shoe retaining element carried by said concentric portion of the pin for engaging the collar and being of a thickness greater than the axial length of the concentric portion, and means including a nut cooperating with the threads of the pin for clamping the collar between said retaining element and the support and for maintaining the pin in a selected position.

4. An anchor pin for adjustably supporting a brake shoe on a support and comprising a bolt having threads at one end for cooperation with a nut and a flange forming a head at the other end, the body portion of said bolt having a concentric cylindrical portion adjacent the head for mounting thereon a shoe retaining element and an eccentric cylindrical portion adjacent said concentric portion for mounting thereon a bearing collar for the shoe.

5. In braking mechanism, a support, two brake shoes having adjacently positioned ends each provided with an opening, an independently adjustable mounting for each shoe end comprising an anchor pin rotatably carried by the support, each of said pins having a flanged head, a concentric cylindrical portion adjacent the head and an eccentric cylindrical portion adjacent the concentric portion, a bearing collar cooperating with the shoe opening and rotatably mounted on the eccentric portion, said collar having an axial thickness greater than the thickness of the shoe at its opening, a retaining plate for the shoes having two spaced openings therein, each of said openings receiving the concentric portion of a pin whereby the pins may transmit force to each other, and means cooperating with each pin for clamping the bearing collar thereon between the plate and the support and for maintaining the pin in adjusted position.

WERNER F. BOLDT.